United States Patent
Xu

(10) Patent No.: US 12,470,068 B2
(45) Date of Patent: Nov. 11, 2025

(54) POWER SUPPLY SYSTEM CONTROL METHOD AND POWER SUPPLY SYSTEM

(71) Applicant: Joulwatt Technology Co., Ltd., Hangzhou (CN)

(72) Inventor: Min Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/739,372

(22) Filed: Jun. 11, 2024

(65) Prior Publication Data
US 2024/0413641 A1    Dec. 12, 2024

(30) Foreign Application Priority Data
Jun. 12, 2023    (CN) .......................... 202310695524.6

(51) Int. Cl.
*H02J 3/38* (2006.01)
*H02J 3/14* (2006.01)
*H02J 3/28* (2006.01)
*H02J 7/00* (2006.01)
*H02J 7/35* (2006.01)

(52) U.S. Cl.
CPC ................ *H02J 3/38* (2013.01); *H02J 3/144* (2020.01); *H02J 3/28* (2013.01); *H02J 7/00712* (2020.01); *H02J 7/007194* (2020.01); *H02J 7/35* (2013.01); *H02J 2300/26* (2020.01)

(58) Field of Classification Search
CPC ........................................................ H02J 3/38
See application file for complete search history.

(56) References Cited

U.S. PATENT DOCUMENTS

| | | | | |
|---|---|---|---|---|
| 9,651,971 | B2* | 5/2017 | Miyamoto | H02J 3/466 |
| 2011/0021186 | A1* | 1/2011 | Fischer | H04W 52/0206 |
| | | | | 455/574 |
| 2012/0078433 | A1* | 3/2012 | Honma | F24D 11/004 |
| | | | | 713/320 |
| 2013/0253781 | A1* | 9/2013 | Li | B60L 1/003 |
| | | | | 701/50 |
| 2014/0060100 | A1* | 3/2014 | Bryson | H02J 3/381 |
| | | | | 62/235.1 |
| 2015/0030901 | A1* | 1/2015 | Bourgeois | H02J 7/0018 |
| | | | | 429/120 |
| 2020/0112258 | A1* | 4/2020 | Kurauchi | B60L 53/67 |
| 2020/0259360 | A1* | 8/2020 | Tagawa | H01M 10/0525 |
| 2021/0281103 | A1* | 9/2021 | Williams | H02J 7/35 |
| 2022/0094168 | A1* | 3/2022 | Ohtsuki | H02J 3/381 |
| 2023/0170726 | A1* | 6/2023 | Harris | B60R 16/033 |

* cited by examiner

Primary Examiner — Daniel Kessie
(74) Attorney, Agent, or Firm — Bayramoglu Law Offices

(57) ABSTRACT

A power supply system control method and a power supply system are provided. The control method includes: controlling a power supply system to enter a first mode based on a power parameter, a temperature parameter, and an electric quantity parameter; and during the first mode, controlling a first regulating circuit to regulate a second switching circuit such that an input voltage of the load module is adjusted to a target voltage, and controlling a first voltage loop to regulate a first switching circuit based on the power parameter, to stabilize an output voltage of a solar cell at a first threshold voltage, where the first threshold voltage is close to an output voltage corresponding to maximum output power of the solar cell.

16 Claims, 9 Drawing Sheets

POWER SUPPLY SYSTEM CONTROL METHOD AND POWER SUPPLY SYSTEM

CROSS REFERENCE TO THE RELATED APPLICATIONS

This application is based upon and claims priority to Chinese Patent Application No. 202310695524.6, filed on Jun. 12, 2023, the entire contents of which are incorporated herein by reference.

TECHNICAL FIELD

The present disclosure relates to the technical field of solar power supply, and specifically, to a power supply system control method and a power supply system.

BACKGROUND

A solar cell power supply system is widely used in many fields due to its characteristics such as independence and no need for a power grid for power supply. One typical application is in the field of video surveillance. In many remote areas or areas where it is not easy to build power facilities, it is an excellent solution to use a solar cell to power a video surveillance system.

However, the solar cell is greatly affected by a weather change, and often needs to work together with an energy storage module. When there is sufficient sunlight, energy of the solar cell is preferentially used to power the video surveillance system, and remaining energy of the solar cell is used to charge the energy storage module. In order to fully charge the energy storage module quickly, the solar cell often needs to work at a maximum output power point. When there is insufficient sunlight, the energy storage module supplies power supplementarily or separately. In addition, the solar cell power supply system is usually installed outdoors, and even in a particularly cold area. Therefore, in order to extend a lifespan of the energy storage module, the energy storage module needs to be preheated before being charging in the case of a low temperature. Because heat required for preheating the energy storage module comes from the solar cell, the solar cell often involves energy distribution management in a power supply process.

At present, during energy distribution of the solar cell power supply system, the following situation may easily occur: the solar cell does not work at maximum output power, or the energy storage module is mistakenly controlled to discharge and preheat, or the video surveillance system loses power during a control process. However, there is no control method that can automatically adapt to different power supply needs for energy distribution in the prior art.

SUMMARY

In order to solve a technical problem that a solar cell power supply system cannot automatically adapt to different power supply needs for energy distribution in the prior art, the present disclosure provides a power supply system control method and a power supply system, where the control method includes:

controlling a power supply system to enter a first mode based on a power parameter, a temperature parameter, and an electric quantity parameter, where in the first mode, a solar cell powers a load module and a heating module, the heating module heats an energy storage module, a second switching circuit connects the output of the solar cell and the input of the load module, a second switching circuit connects the output of the solar cell and the input of the energy storage module, and a first switching circuit connects the output of the solar cell and the input of the heating module;

during the first mode, controlling a first regulating circuit to regulate the second switching circuit to adjust an input voltage of the load module to a target voltage; and according to a power parameter, controlling a first voltage loop to regulate the first switching circuit to stabilize an output voltage of the solar cell at a first threshold voltage, where the first threshold voltage is close to a preset threshold voltage, and the preset threshold voltage is an output voltage of the solar cell working at a maximum output power point.

Further, when maximum output power of the solar cell is greater than target power of the load module, an electric quantity of the energy storage module is less than a first preset electric quantity, and a temperature of the energy storage module is less than a first temperature threshold, the power supply system is controlled to enter the first mode; and when a sum of target power of the heating module and the target power of the load module is greater than the maximum output power of the solar cell, the first voltage loop is controlled to regulate the first switching circuit.

Further, during the first mode, when the temperature of the energy storage module increases to or exceeds a second temperature threshold, controlling the power supply system to enter a second mode, where in the second mode, the solar cell powers the energy storage module and the load module.

Further, during the second mode, if the temperature of the energy storage module decreases to or is less than a preset temperature threshold, the power supply system is controlled to switch to the third mode;

in the third mode, the solar cell powers the energy storage module, the load module and the heating module;

the preset temperature threshold is greater than the first temperature threshold and less than the second temperature threshold.

Further, when a sum of target power of the energy storage module and the target power of the load module is greater than the maximum output power of the solar cell, reducing the charging current of said energy storage module starts said first voltage loop, so that the power supply system switches to the third mode.

Further, during the second mode, a second voltage loop is controlled to regulate the second switching circuit based on a power parameter, to stabilize the output voltage of the solar cell at a second threshold voltage, and a second regulating circuit is controlled to regulate a charging and discharging switch according to an electric quantity parameter, where the charging and discharging switch is connected between the load module and the energy storage module, the second threshold voltage is close to or equal to the preset threshold voltage, and said second threshold voltage is less than said first threshold voltage.

Further, during the third mode, according to an electric quantity parameter, controlling the first regulating circuit to regulate the second switching circuit to adjust the input voltage of said load module to a target voltage, or controlling the first regulating circuit to regulate a second switching circuit to adjust the charging current of the energy storage module; and according to a power parameter, controlling the first voltage loop to regulate the first switching circuit to stabilize an output voltage of the solar cell at the first threshold voltage.

Further, when a sum of the target power of said energy storage module and the target power of said load module is greater than the maximum output power of the solar cell, said second voltage loop is controlled to regulate the second switching circuit; and if the electric quantity of the energy storage module is greater than a second preset electric quantity, said second regulating circuit controls said charging and discharging switch to be fully conductive; and if the electric quantity of the energy storage module is less than or equal to a second preset electric quantity, said second regulating circuit is controlled to regulate a conduction degree of said charging and discharging switch, said second preset electric quantity is less than said first preset electric quantity.

Further, during the second mode, controlling said first regulating circuit to regulate the second switching circuit to adjust the input voltage of said load module to a target voltage, or controlling said first regulating circuit to regulate the second switching circuit to adjust the charging current of said energy storage module, in accordance with a power parameter and an electric quantity parameter.

when the electric quantity of the energy storage module is less than or equal to a second preset electric quantity, a sum of a target power of the energy storage module, a target power of the load module and a target power of the heating module is greater than a maximum output power of the solar cell, said first regulating circuit is controlled to regulate the second switching circuit to adjust the input voltage of said load module to a target voltage, said second regulating circuit regulates a conduction degree of said charging and discharging switch, said first voltage loop is controlled to regulate the first switching circuit, said charging and discharging switch is connected between the load module and the energy storage module, said second preset electric quantity is less than said first preset electric quantity; and when the electric quantity of the energy storage module is greater than a second preset electric quantity, a sum of a target power of the energy storage module, a target power of the load module and a target power of the heating module is greater than a maximum output power of the solar cell, said first regulating circuit is controlled to regulate the second switching circuit to adjust the charging current of the energy storage module, said second regulating circuit controls said charging and discharging switch to be fully conductive, said first voltage loop is controlled to regulate the first switching circuit.

Further, adjusting the charging current of said energy storage module maintains the temperature of said energy storage module at said preset temperature threshold.

Further, during the second mode, when the electric quantity of the energy storage module increases to or exceeds the first preset electric quantity, the power supply system is controlled to enter a fourth mode, where in the fourth mode, the solar cell powers the load module; and during the fourth mode, the first regulating circuit is controlled to regulate the second switching circuit to adjust the input voltage of the load module to the target voltage.

Further, the power supply system tracks maximum output power of the solar cell in real time;

when the maximum output power of the solar cell is less than target power of the load module, the power supply system is controlled to enter a fifth mode, where in the fifth mode, the energy storage module and the solar cell power the load module; and during the fifth mode, a second voltage loop is controlled to regulate the second switching circuit to stabilize the output voltage of the solar cell at a second threshold voltage, where the second threshold voltage is close to or equal to the preset threshold voltage.

Further, the first regulating circuit adjusts the input voltage of said load module to a target voltage or adjusts the charging current of said energy storage module by regulating a duty cycle of said second switching circuit.

Further, the first switching circuit comprises a conducting transistor, and the first voltage loop adjusts a conduction degree of the conducting transistor according to the output voltage of the solar cell and the first threshold voltage.

Further, the first switching circuit comprises a direct current (DC)-DC converter, the first voltage loop adjusts a duty cycle of the DC-DC converter, according to the output voltage of the solar cell and the first threshold voltage.

Further, the second voltage loop adjusts a duty cycle of the second switching circuit, according to the output voltage of the solar cell and the second threshold voltage;

Further, during said first mode, if a sum of the target power of the heating module and the target power of the load module is less than or equal to the maximum output power of the solar cell, a third regulating circuit regulates said first switching circuit to adjust an input voltage of the heating module to a target voltage.

Further, the first threshold voltage and the second threshold voltage are adjusted based on the maximum output power tracked in real time.

A power supply system adopts the control method described above.

The power supply system and the power supply system control method provided in the present disclosure take into account energy distribution in all modes to ensure preferential power supply for the load module, and further ensure charging efficiency of the energy storage module, thereby improving effective utilization of energy. In addition, during energy distribution in various scenarios, the solar cell is also controlled to work at the maximum output power point, thereby improving working efficiency of the solar cell.

DETAILED DESCRIPTION OF THE EMBODIMENTS

To facilitate the understanding of the present disclosure, the present disclosure is described more completely below with reference to the accompanying drawings. Preferred embodiments of the represent disclosure are shown in the accompanying drawings. However, the present disclosure can be embodied in various forms without being limited to the embodiments set forth herein. On the contrary, these embodiments are provided to make the present disclosure more thoroughly and comprehensively understood.

As described in BACKGROUND, existing control strategies have defects and cannot adaptively adjust energy distribution among various modules based on a power supply demand change during operation of a power supply system, resulting in an operational failure of the power supply system.

Based on the above problem, the present disclosure provides a power supply system and a matching control strategy for the power supply system to adaptively adjust energy distribution among various modules based on a power supply demand change during operation of the power supply system, so as to ensure efficient and normal operation of the power supply system.

Figure 1:
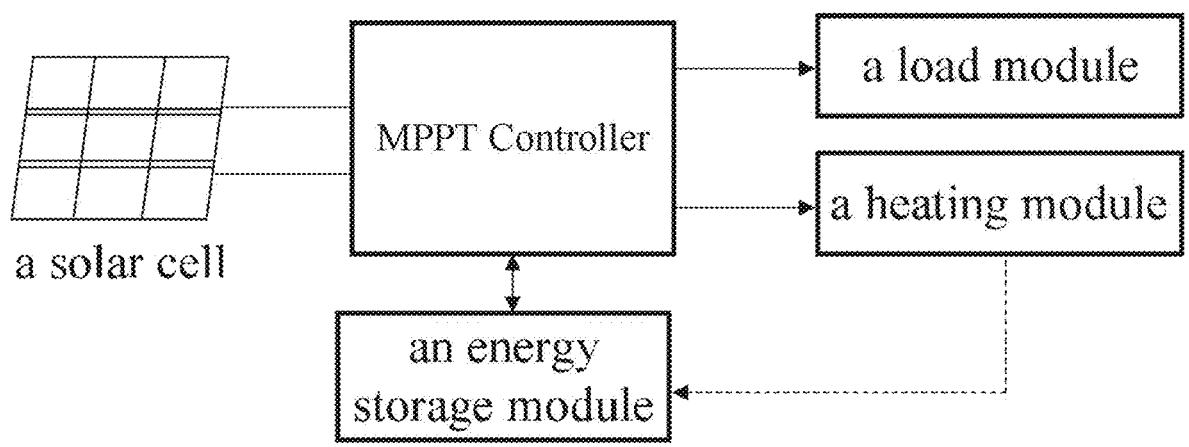
FIG. 1 is a structural block diagram of a power supply system according to the present disclosure.
Figure 2:
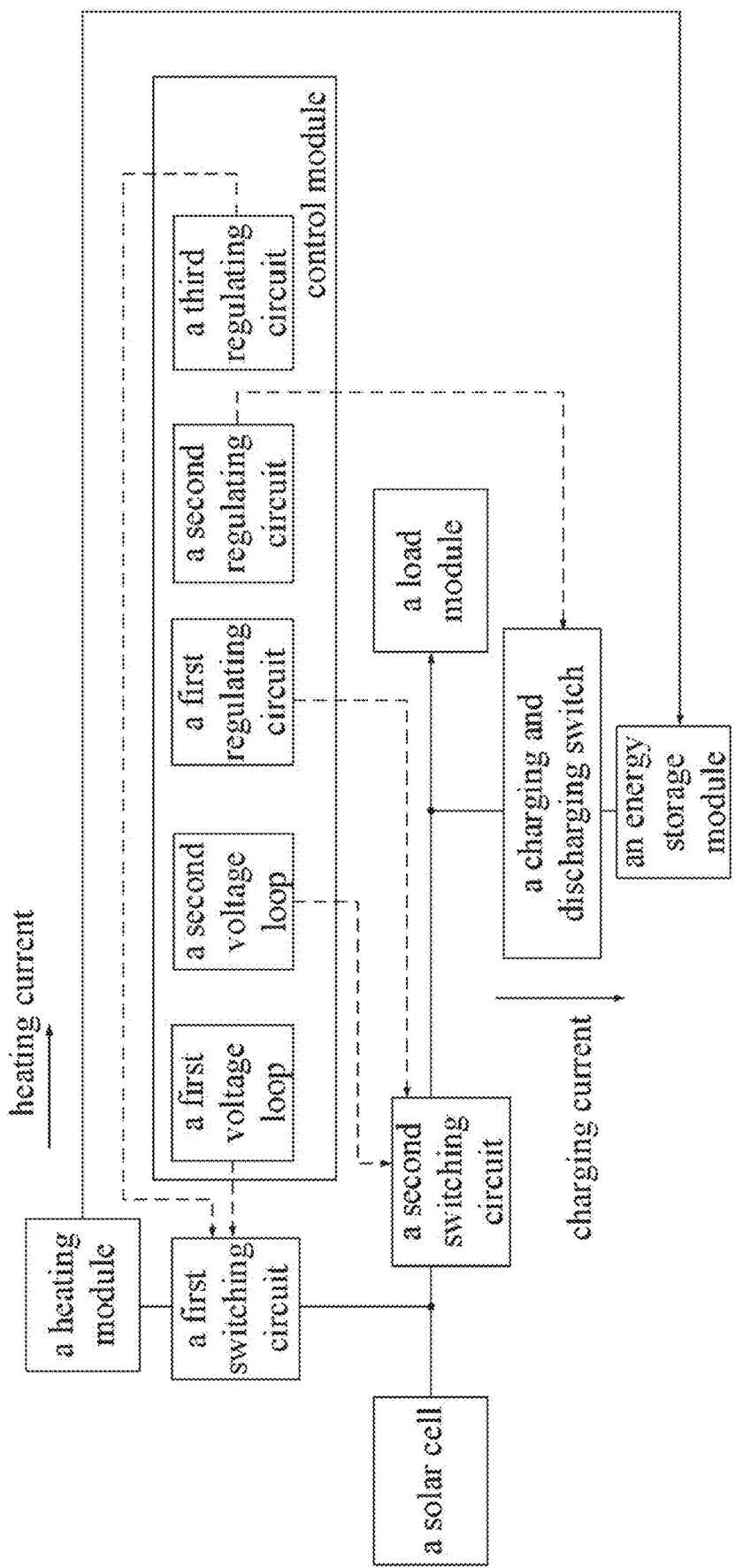
FIG. 2 is circuit structure diagrams of a power supply system according to the present disclosure.

Specifically, as shown in FIG. 1, or FIG. 2, the present disclosure provides a power supply system, including a solar cell, a load module, an energy storage module, a heating module, and a control module. The output of the solar cell is connected to the input of the load module through a second switching circuit, the output of the solar cell is connected to the input of the energy storage module through a second switching circuit, the output of the solar cell is connected to the input of the heating module through a first switching circuit, and a charging and discharging switch is also connected between the load module and the energy storage module. The control module controls the power supply system to enter a first mode, a second mode, a third mode, a fourth mode, or a fifth mode based on a power parameter, a temperature parameter, and an electric quantity parameter, and further regulates energy distribution based on changes in the parameters when the power supply system operates.

In the first mode, the solar cell converts light energy into electric energy to power the load module and the heating module, such that the load module operates, and the heating module heats the energy storage module.

In the second mode, the solar cell converts the light energy into the electric energy to power the load module and the energy storage module, such that the load module operates, and the energy storage module is charged.

In the third mode, the solar cell converts the light energy into the electric energy to power the load module, the energy storage module, and the heating module, such that the load module operates, the energy storage module is charged, and the heating module heats the energy storage module.

In the fourth mode, the solar cell converts the light energy into the electric energy to power the load module, such that the load module operates.

In the fifth mode, the solar cell converts the light energy into the electric energy to power the load module, and the energy storage module also powers the load module, such that the load module operates.

"A control module controls the power supply system to enter a first mode, a second mode, a third mode, a fourth mode, or a fifth mode based on a power parameter, a temperature parameter, and an electric quantity parameter, and further adjusts energy distribution based on changes in the parameters when the power supply system" is detailed below.

When maximum output power of the solar cell is greater than target power of the load module, a temperature of the energy storage module is less than a first temperature threshold, and an electric quantity of the energy storage module is less than a first preset electric quantity, the control module controls the power supply system to enter the first mode. In this case, the solar cell powers both the load module and the heating module, and the heating module heats the energy storage module. When the electric quantity of the energy storage module is as low as the first preset electric quantity, it indicates that the electric quantity is not full. When the temperature of the energy storage module is as low as the first temperature threshold, the energy storage module cannot enter a charging state.

During the first mode, a first regulating circuit is controlled to regulate the output voltage of the second switching circuit, so that the input voltage of the load module is adjusted to a target voltage; and according to a power parameter, a first voltage loop is controlled to regulate the input voltage of the first switching circuit to stabilize the output voltage of the solar cell at a first threshold voltage, or a third regulating circuit is controlled to adjust the output voltage of the first switching circuit in order to adjust the input voltage of the heating module to a target voltage. The first threshold voltage is close to a preset threshold voltage, and the preset threshold voltage is an output voltage of the solar cell working at a maximum output power point.

Figure 3:
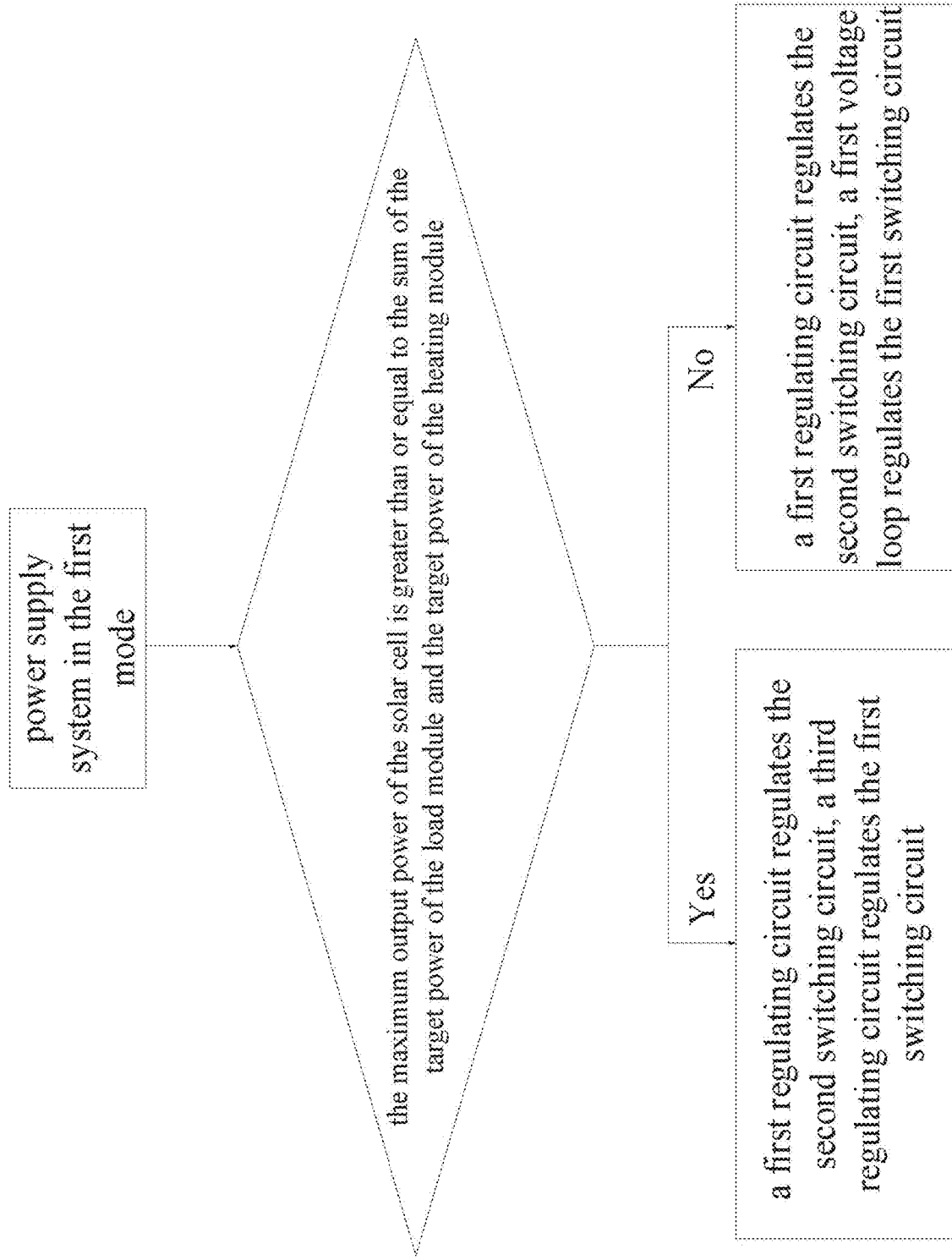
FIG. 3 shows control logic in a first mode according to the present disclosure.
Figure 6:
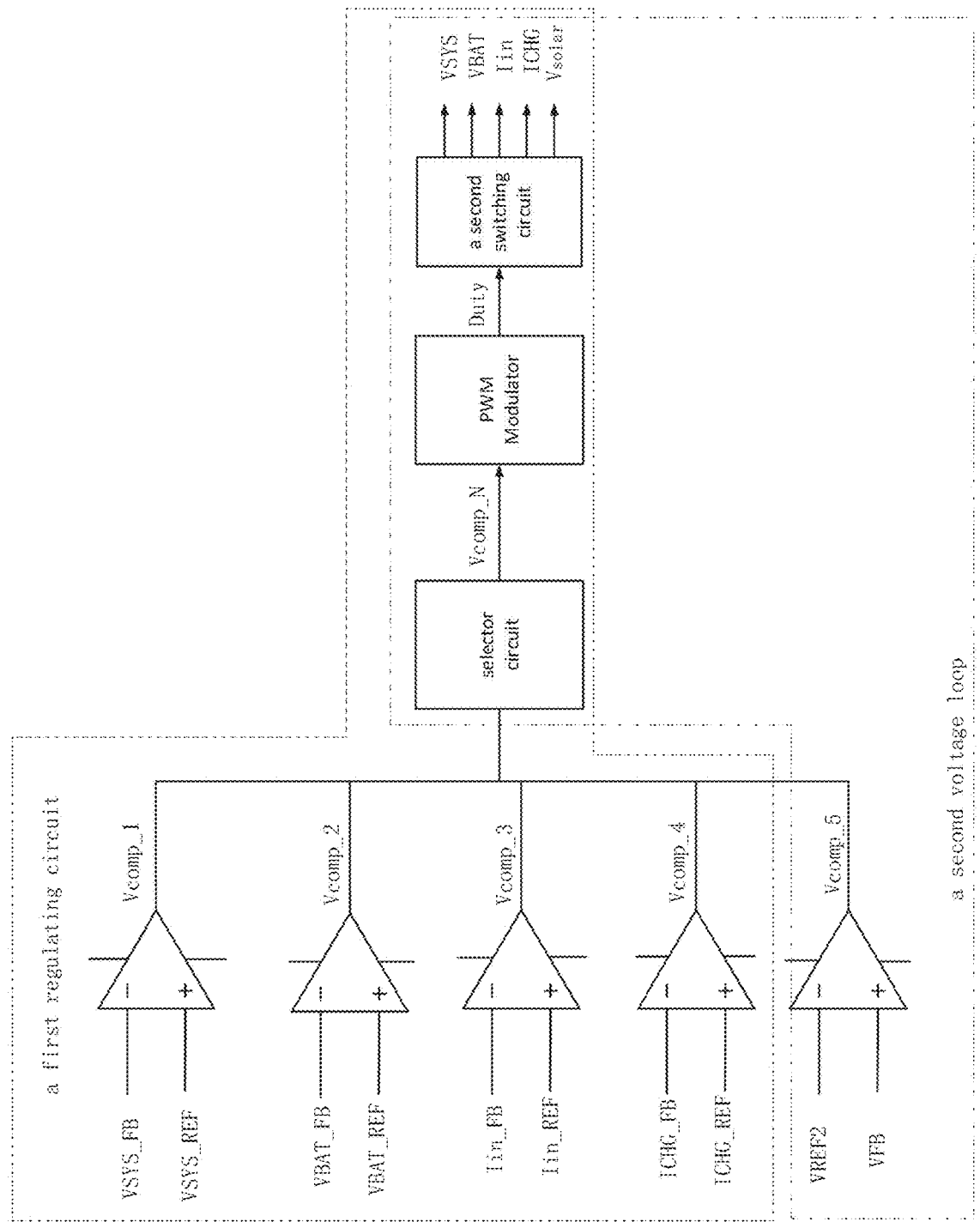
FIG. 6 is a structural diagram of the control circuit of a second switching circuit.
Figure 7:
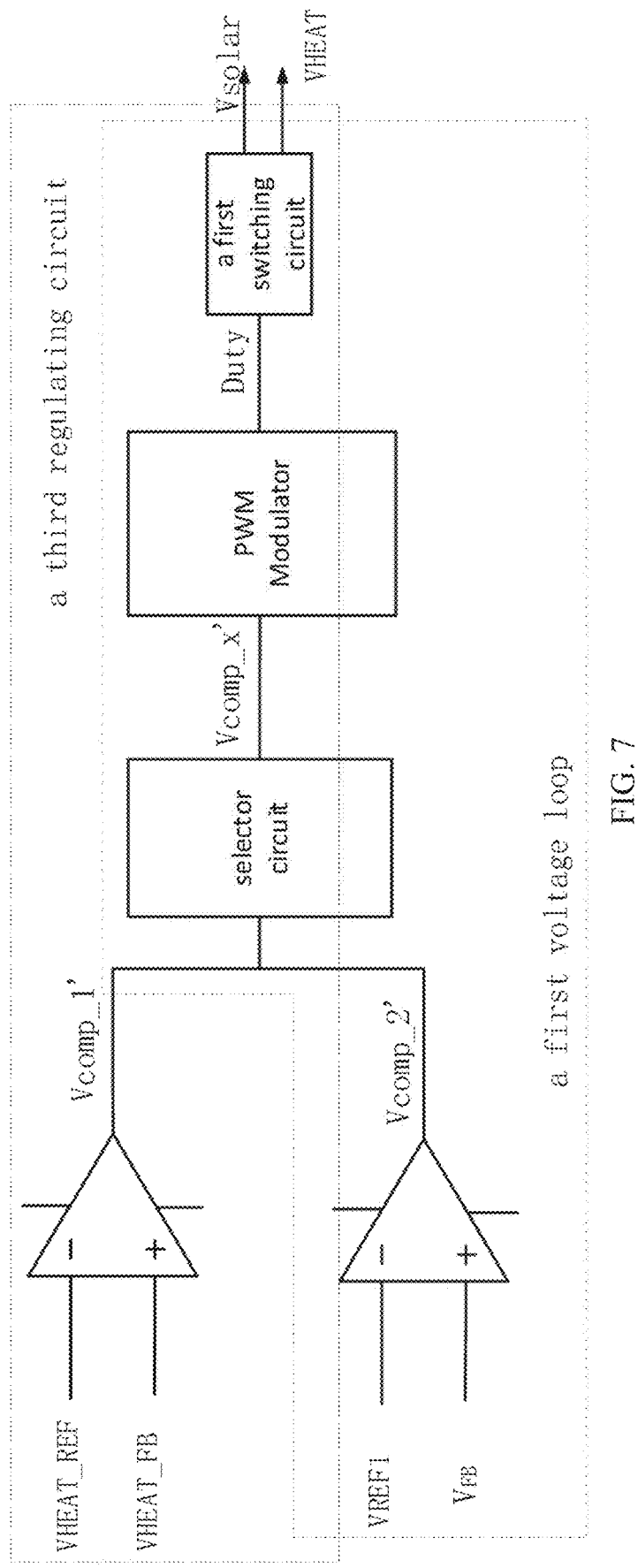
FIG. 7 is a structural diagram of the control circuit of a first switching circuit.

Further, during the first mode, as shown in FIG. 3:

(1) When the maximum input power of the solar cell is equal to or greater than a sum of the target power of the load module and target power of the heating module, a first regulating circuit is controlled to regulate the output voltage of the second switching circuit, and a third regulating circuit is controlled to regulate the output voltage of the first switching circuit. As shown in FIG. 6, the first regulating circuit generates a PWM control signal based on a difference between input voltage feedback signal VSYS_FB of the load module and a target voltage VSYS_REF of the load module, to control the duty cycle of the second switching circuit to regulate the output voltage of the second switching circuit, such that an input voltage of the load module is the target voltage VSYS_REF and actual power meeting the load module is the target power. In addition, as shown in FIG. 7, the third regulating circuit generates a PWM control signal based on a difference between input voltage feedback signal VHEAT_FB of the heating module and a target voltage VHEAT_REF of the heating module, to control the duty cycle of the first switching circuit to regulate the output voltage of the first switching circuit, such that an input voltage of the heating module is the target voltage VHEAT_REF and actual power of the heating module is the target power.

(2) When the maximum input power of the solar cell is less than the sum of the target power of the load module and the target power of the heating module, if the strategy mentioned in (1) is still used for control, an output of the solar cell will be pulled down. Therefore, in this case, the first regulating circuit generates the PWM control signal based on the difference between the input voltage feedback signal VSYS_FB of the load module and a target voltage VSYS_REF of the load module, to control the duty cycle of the second switching circuit to regulate the output voltage of the second switching circuit, such that the input voltage of the load module is the target voltage VSYS_REF and the actual power meeting the load module is the target power. In addition, as shown in FIG. 7, a first voltage loop generates a PWM control signal based on a difference between output voltage feedback signal VFB of the solar cell and a first voltage threshold VREF1, to control the duty cycle of the first switching circuit to regulate the input voltage of the first switching circuit, thereby stabilizing output voltage Vsolar of the solar cell at the first voltage threshold and changing the heating current of the heating module. The first voltage threshold is close to a preset threshold voltage, and the preset threshold voltage is an output voltage corresponding to the maximum output power of the solar cell.

When the maximum output power of the solar cell is greater than target power of the load module, the temperature of the energy storage module is equal to or greater than a second temperature threshold, and the electric quantity of the energy storage module is less than the first preset electric quantity, the power supply system enters the second mode. In this case, the solar cell powers both the load module and the energy storage module, and the energy storage module is charged. When the temperature of the energy storage module exceeds the second temperature threshold, the charging state can be entered normally. AND the second temperature threshold is greater than the first temperature threshold. When the electric quantity of the energy storage module is as low as the first preset electric quantity, it indicates that the electric quantity is not full.

During the second mode, according to an electric quantity parameter and a power parameter, the first regulating circuit is controlled to regulate the output voltage of the second switching circuit to adjust an input voltage of the load module to a target voltage, or the first regulating circuit is controlled to regulate the second switching circuit to adjust the charging current of the energy storage module, or a second voltage loop is controlled to adjust the input voltage of the second switching circuit in order to make the output voltage of the solar cell stabilize at a second threshold voltage. The second threshold voltage is close to or equal to the preset threshold voltage, and the second threshold voltage is less than the first threshold voltage.

Figure 4:
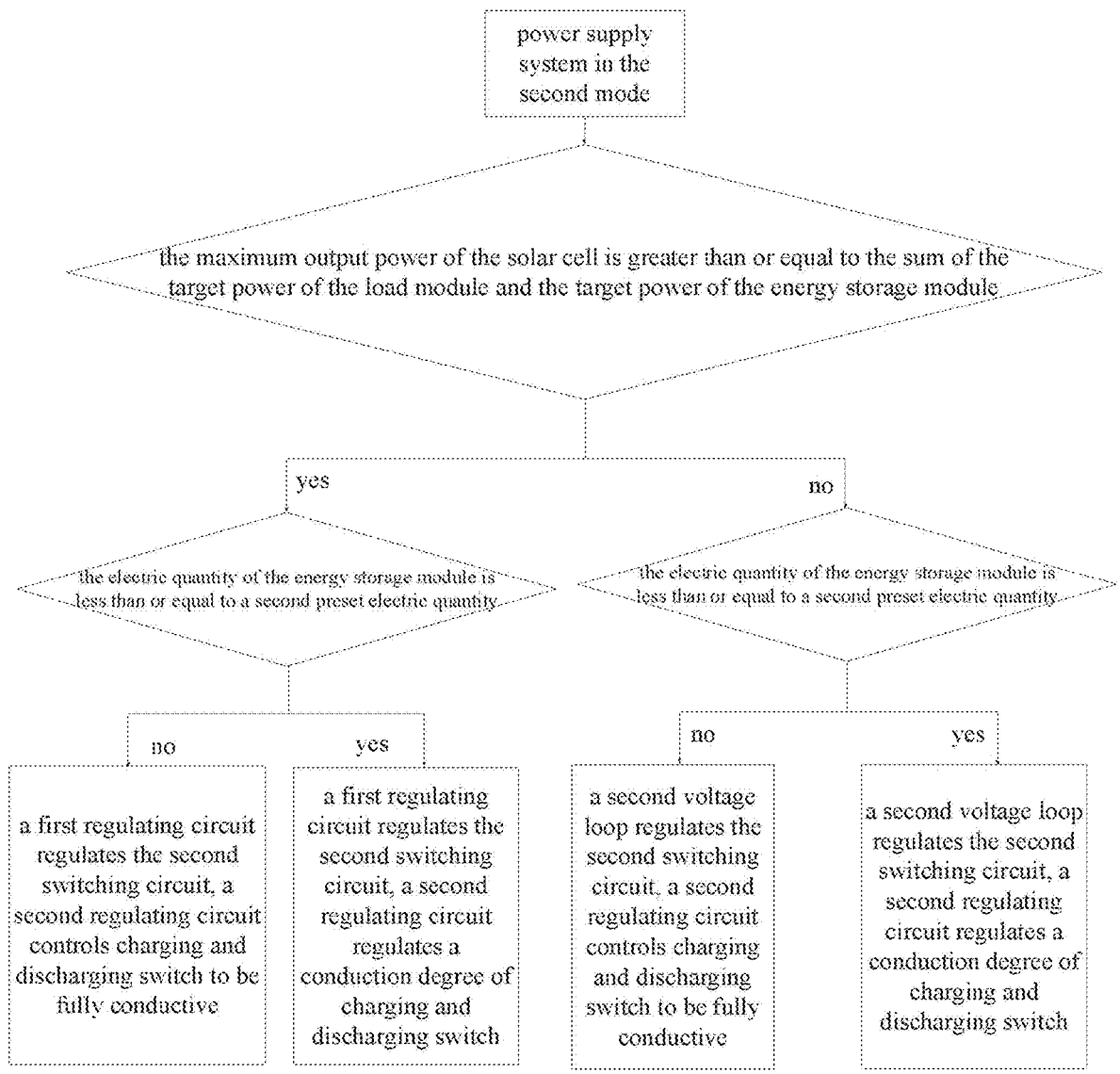
FIG. 4 shows control logic in a second mode according to the present disclosure.
Figure 8:
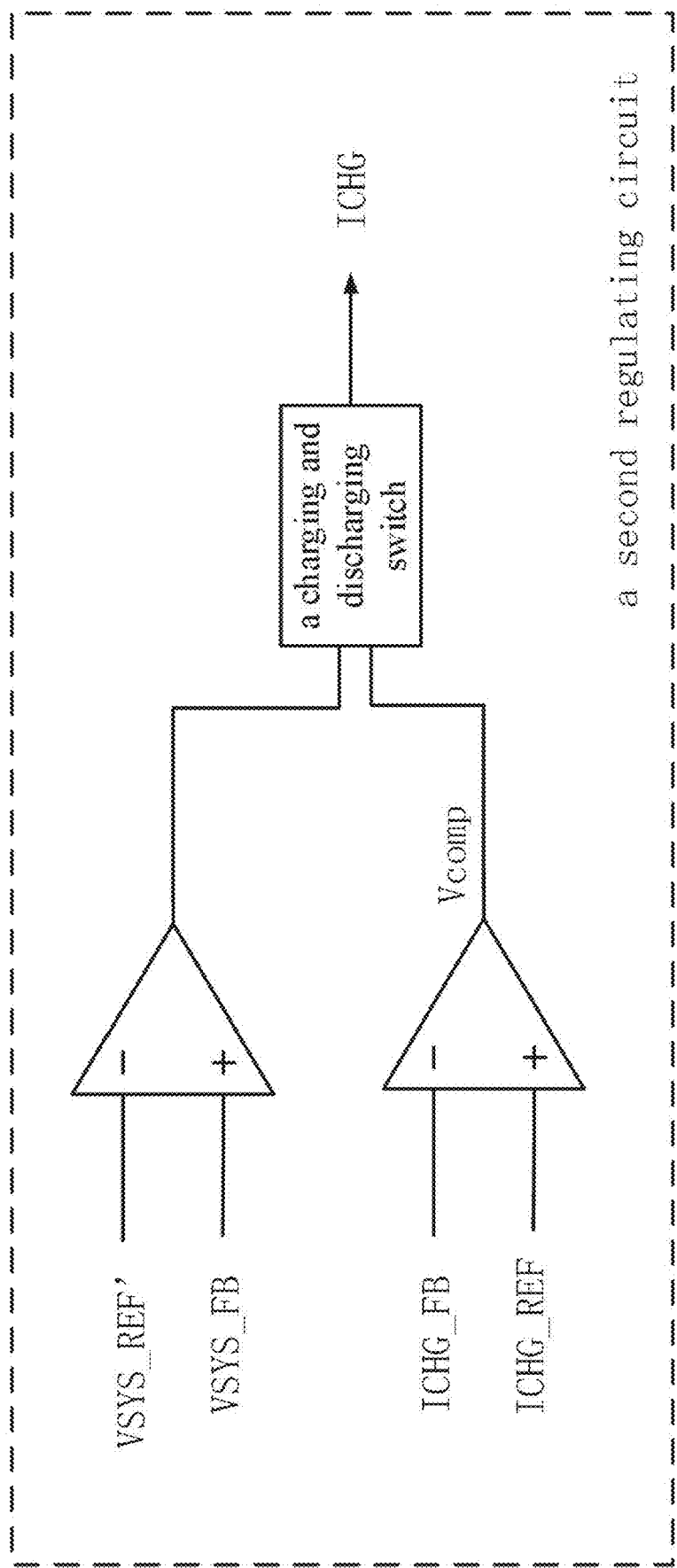
FIG. 8 is a structural diagram of the control circuit of a charging and discharging switch.

Further, during the second mode, as shown in FIG. 4:
(1) If the electric quantity of the energy storage module is less than or equal to a second preset electric quantity, and the maximum output power of the solar cell is greater than or equal to the sum of the target power of the load module and the target power of the energy storage module, the first regulating circuit is controlled to regulate the output voltage of the second switching circuit, and a second regulating circuit is controlled to regulate a conduction degree of the charging and discharging switch. The first regulating circuit generates the PWM control signal based on the difference between the input voltage feedback signal VSYS_FB of the load module and a target voltage VSYS_REF of the load module, to control the duty cycle of the second switching circuit to regulate the output voltage of the second switching circuit, such that the input voltage of the load module is the target voltage VSYS_REF and the actual power meeting the load module is the target power. In addition, as shown in FIG. 8, the second regulating circuit regulates a voltage of a control terminal of the charging and discharging switch based on a difference between charging current feedback signal ICHG_FB of the energy storage module and a preset charging current ICHG_REF, thereby adjusting a charging current of the energy storage module by adjusting a conduction degree of the charging and discharging switch. During the charging of the energy storage module, the input voltage feedback signal VSYS_FB of the load module and clamping reference signal VSYS_REF' can be compared to determine whether the electric quantity of the energy storage module is less than the second preset electric quantity. If the input voltage feedback signal VSYS_FB of the load module is less than the clamping reference signal VSYS_REF', it indicates that the electric quantity of the energy storage module is less than the second preset electric quantity.

The second preset electric quantity is less than the first preset electric quantity. When the electric quantity of the energy storage module is less than or equal to the second preset electric quantity, and the charging and discharging switch is fully conductive, so that the input voltage of the load module is approximately equal to the voltage of the energy storage module, and the voltage of the energy storage module is less than the target voltage of the load module. When the electric quantity of the energy storage module is greater than the second preset electric quantity, and the charging and discharging switch is fully conductive, so that the input voltage of the load module is approximately equal to the voltage of the energy storage module, and the voltage of the energy storage module is greater than or equal to the target voltage of the load module.

(2) If the electric quantity of the energy storage module is greater than the second preset electric quantity, and the maximum output power of the solar cell is greater than or equal to the sum of the target power of the load module and the target power of the energy storage module, the first regulating circuit is controlled to regulate the second switching circuit to adjust the charging current of the energy storage module, and the second regulating circuit is controlled to control the full conduction of the charging and discharging switch. The first regulating circuit generates a PWM control signal based on a difference between the charging current feedback signal ICHG_FB of the energy storage module and the preset charging current ICHG_REF, to regulate a duty cycle of the second switching circuit, thereby adjusting the charging current of the energy storage module.

(3) If the electric quantity of the energy storage module is less than or equal to a second preset electric quantity, and the maximum output power of the solar cell is less than the sum of the target power of the load module and the target power of the energy storage module, the second voltage loop is controlled to adjust the input voltage of the second switching circuit in order to make the output voltage of the solar cell stabilize at the second threshold voltage, and the second regulating circuit is controlled to regulate a conduction degree of the charging and discharging switch to adjust the charging current of the energy storage module. Further, the second voltage loop generates a PWM control signal based on a difference between output voltage feedback signal VFB of the solar cell and a second voltage threshold VREF2, to regulate a duty cycle of the second switching circuit to adjust the input voltage of the second switching circuit, thereby stabilizing output voltage Vsolar of the solar cell at the second voltage threshold. The second regulating circuit regulates a voltage of a control terminal of the charging and discharging switch based on a difference between charging current feedback signal ICHG_FB of the energy storage module and a preset charging current ICHG_REF, thereby adjusting a charging current of the energy storage module by adjusting a conduction degree of the charging and discharging switch.

(4) If the electric quantity of the energy storage module is greater than the second preset electric quantity, and the maximum output power of the solar cell is less than the sum of the target power of the load module and the target power of the energy storage module, the second voltage loop is controlled to adjust the input voltage of the second switching circuit in order to make the output voltage of the solar cell stabilize at the second threshold voltage, and the second regulating circuit controls the charging and discharging switch to be fully conductive. Further, the second voltage loop generates a PWM control signal based on a difference between output voltage feedback signal VFB of the solar cell and a second voltage threshold VREF2, to regulate a duty cycle of the second switching circuit to adjust the input voltage of the second switching circuit, thereby stabilizing output voltage Vsolar of the solar cell at the second voltage threshold.

In addition, during the second mode, the temperature of the energy storage module may continue to decrease, and as a result, the energy storage module cannot be charged. In this case, the power supply system exits the second mode and enters the first mode. If this case happens, the power supply system may switch between the first mode and the second mode repeatedly. This not only causes a large energy loss, but also damages service lives of the energy storage module and the heating module. In order to avoid this case, during the second mode, if it is detected that the temperature of the energy storage module decreases to or is less than the preset temperature threshold, the power supply system is controlled to enter the third mode. The preset temperature threshold is greater than the first temperature threshold and less than the second temperature threshold.

Further, during the second mode, if the maximum output power of the solar cell is less than the sum of the target power of the load module and the target power of the energy storage module, the charging current of the energy storage module is reduced, so that the output voltage of the solar cell is increased, the first voltage loop is adaptively activated, and the power supply system is switched into the third mode. If the maximum output power of the solar cell is greater than or equal to the sum of the target power of the load module and the target power of the energy storage module, the third regulation circuit directly controls the first switching circuit, so that the power supply system is switched into the third mode.

When the maximum output power of the solar cell is greater than the target power of the load module, the temperature of the energy storage module decreases from the second temperature threshold or above the second temperature threshold to the preset temperature threshold, and the electric quantity of the energy storage module is less than the first preset electric quantity, the control module controls the power supply system to enter the third mode. In this case, the solar cell powers the load module, the energy storage module, and the heating module, the energy storage module is charged, and the heating module heats the energy storage module.

During the third mode, according to the electric quantity parameter, the first regulating circuit is controlled to regulate the output voltage of the second switching circuit to adjust an input voltage of the load module to a target voltage, or the first regulating circuit is controlled to regulate the second switching circuit to adjust the charging current of the energy storage module; and according to the power parameter, the first voltage loop is controlled to regulate the input voltage of the first switching circuit to stabilize the output voltage of the solar cell at a first threshold voltage, or the third regulating circuit is controlled to regulate the output of the first switching circuit voltage to make the input voltage of the heating module a target voltage.

Figure 5:
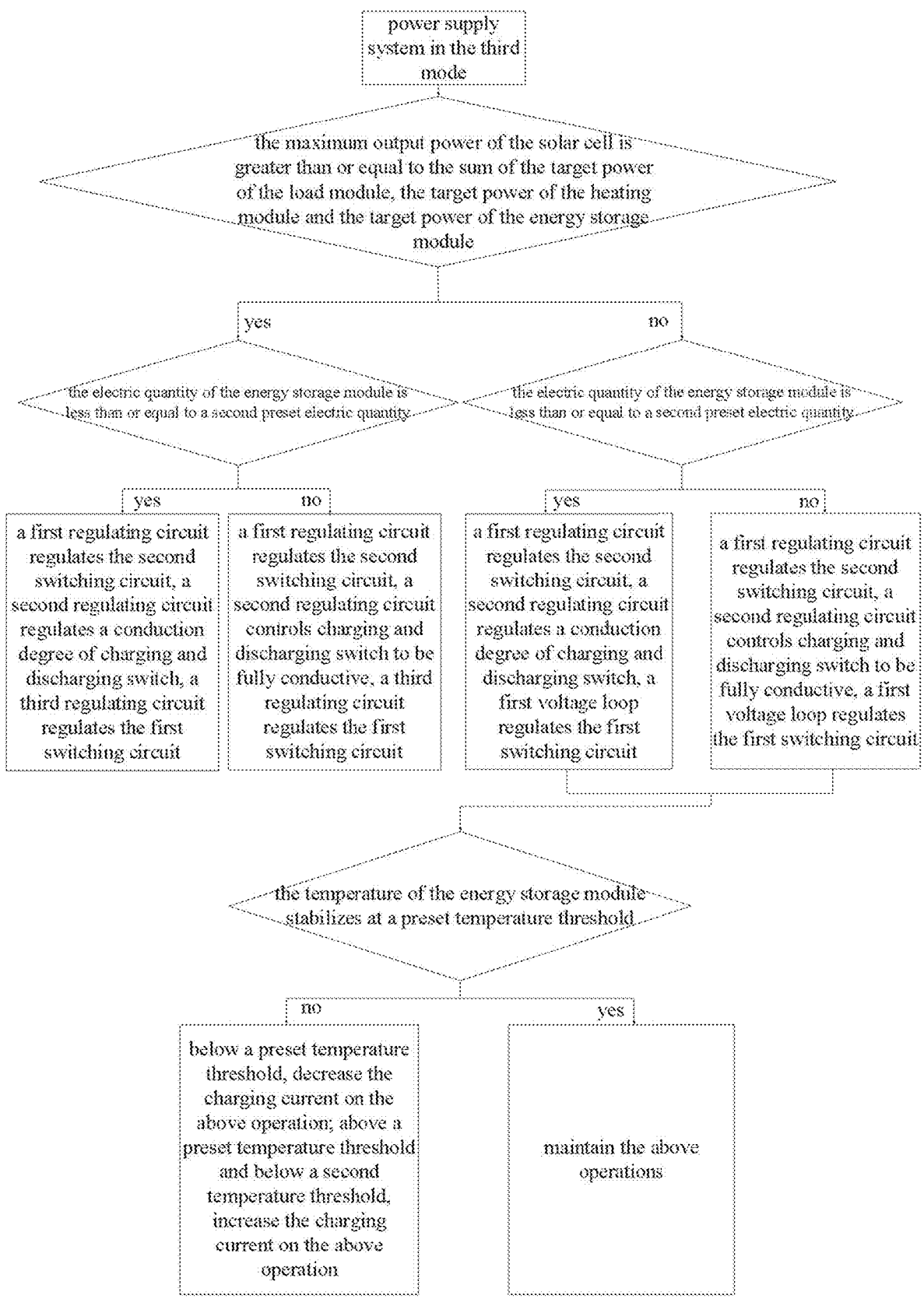
FIG. 5 shows control logic in a third mode according to the present disclosure.

Further, during the third mode, as shown in FIG. 5:

(1) When the maximum output power of the solar cell is equal to or greater than a sum of the target power of the load module, the target power of the heating module, and target power of the energy storage module, and the electric quantity of the energy storage module is less than or equal to the second preset electric quantity, the first regulating circuit is controlled to regulate the output voltage of the second switching circuit, the second regulating circuit is controlled to regulate a conduction degree of the charging and discharging switch, and the third regulating circuit is controlled to regulate the output voltage of the first switching circuit. The first regulating circuit generates the PWM control signal based on the difference between the input voltage feedback signal VSYS_FB of the load module and a target voltage VSYS_REF of the load module, to control the duty cycle of the second switching circuit to adjust the output voltage of the second switching circuit, such that the input voltage of the load module is the target voltage VSYS_REF and the actual power meeting the load module is the target power. In addition, the second regulating circuit regulates the voltage of the control terminal of the charging and discharging switch based on the difference between the charging current feedback signal ICHG_FB of the energy storage module and a preset charging current ICHG_REF, thereby adjusting the charging current of the energy storage module by adjusting the conduction degree of the charging and discharging switch. The third regulating circuit generates the PWM control signal based on the difference between the heating current feedback signal VHEAT_FB of the heating module and a target voltage VHEAT_REF of the heating module, to control the duty cycle of the first switching circuit to adjust the output voltage of the first switching circuit, such that an input voltage of the heating module is the target voltage VHEAT_REF and the actual power of the heating module is the target power.

(2) When the maximum output power of the solar cell is equal to or greater than the sum of the target power of the load module, the target power of the heating module, and the target power of the energy storage module, and the electric quantity of the energy storage module is greater than the second preset electric quantity, the first regulating circuit is controlled to regulate the second switching circuit to adjust the charging current of the energy storage module, the second regulating circuit controls the charging and discharging switch to be fully conductive, and the third regulating circuit is controlled to regulate the output voltage of the first switching circuit. The first regulating circuit generates the PWM control signal based on the difference between the charging current feedback signal ICHG_FB of the energy storage module and a preset charging current ICHG_REF, to regulate the duty cycle of the second switching circuit, thereby adjusting the charging current of the energy storage module. In addition, the third regulating circuit generates the PWM control signal based on the difference between the heating current feedback signal VHEAT_FB of the heating module and a target voltage VHEAT_REF of the heating module, to control the duty cycle of the first switching circuit to regulate the output voltage of the first switching circuit, such that an input voltage of the heating module is the target voltage VHEAT_REF and the actual power of the heating module is the target power.

(3) When the maximum output power of the solar cell is less than the sum of the target power of the load module, the target power of the heating module, and the target power of the energy storage module, and the electric quantity of the energy storage module is less than or equal to the second preset electric quantity, the first regulating circuit is controlled to regulate the output voltage of the second switching circuit, the second regulating circuit is controlled to regulate a conduction degree of the charging and discharging switch, and the first voltage loop is controlled to regulate the input voltage of the first switching circuit. The first regulating circuit generates the PWM control signal based on the difference between the input voltage feedback signal VSYS_FB of the load module and a target voltage VSYS_REF of the load module, to control the duty cycle of the second switching circuit to adjust the output voltage of the second switching circuit, such that the input voltage of the load module is the target voltage and the actual power meeting the load module is the target power. In addition, the second regulating circuit regulates the voltage of the control terminal of the charging and discharging switch based on the difference between the charging current feedback signal ICHG_FB of the energy storage module and the preset charging current ICHG_REF, thereby adjusting the charging current of the energy storage module by adjusting the conduction degree of the charging and discharging switch. In addition, the first voltage loop generates the PWM control signal based on the difference between the output voltage feedback signal VFB of the solar cell and the first voltage threshold VREF1, to regulate the duty cycle of the first switching circuit to adjust the input voltage of the first switching circuit, thereby stabilizing the output voltage Vsolar of the solar cell at the first voltage threshold and changing the heating current of the heating module.

(4) When the maximum output power of the solar cell is less than the sum of the target power of the load module, the target power of the heating module, and the target power of the energy storage module, and the electric quantity of the energy storage module is greater than the second preset electric quantity, the first regulating circuit is controlled to regulate the second switching circuit to adjust the charging current of the energy storage module, the second regulating circuit controls the charging and discharging switch to be fully conductive, and the first voltage loop is controlled to regulate the input voltage of the first switching circuit. The first regulating circuit generates the PWM control signal based on the difference between the charging current feedback signal ICHG_FB of the energy storage module and the preset charging current ICHG_REF, to regulate the duty cycle of the second switching circuit, thereby adjusting the charging current of the energy storage module. In addition, the first voltage loop generates the PWM control signal based on the difference between the output voltage feedback signal VFB of the solar cell and the first voltage threshold VREF1, to regulate the duty cycle of the first switching circuit to adjust the input voltage of the first switching circuit, thereby stabilizing the output voltage Vsolar of the solar cell at the first voltage threshold and changing the heating current of the heating module.

Further, during the third mode, when the maximum output power of the solar cell is less than the sum of the target power of the load module, the target power of the heating module, and the target power of the energy storage module, in order to prevent the energy storage module from entering an unchargeable state and improve charging efficiency of the energy storage module, when the temperature of the energy storage module is greater than the preset temperature threshold, the charging current of the energy storage module is increased to make the first voltage loop adaptively reduce the heating current; or when the temperature of the energy storage module is less than the preset temperature threshold, the charging current of the energy storage module is decreased to make the first voltage loop adaptively increase the heating current. The temperature of the energy storage module is thus controlled to stabilize at the preset temperature threshold.

When the maximum output power of the solar cell is greater than the target power of the load module, and the electric quantity of the energy storage module is equal to or greater than the first preset electric quantity, the control module controls the power supply system to enter the fourth mode. In this case, the solar cell powers the load module. During the fourth mode, the first regulating circuit generates the PWM control signal based on the difference between the input voltage feedback signal VSYS_FB and a target voltage VSYS_REF of the load module, to control the duty cycle of the second switching circuit to adjust the output voltage of the second switching circuit, such that the input voltage of the load module is the target voltage VSYS_REF and the actual power meeting the load module is the target power.

When the maximum output power of the solar cell is less than the target power of the load module, the control module controls the power supply system to enter the fifth mode. In this case, the solar cell and the energy storage module power the load module. During the fifth mode, the second voltage loop is controlled to generate the PWM control signal based on the difference between the output voltage feedback signal VFB of the solar cell and the second voltage threshold VREF2, to regulate the duty cycle of the second switching circuit to adjust the input voltage of the second switching circuit, thereby the output voltage of the solar cell is stabilized at the second voltage threshold. At the same time, the second regulating circuit regulates the charging and discharging switches to control the discharging current of the energy storage module.

It should be noted that the power supply system enters a sixth mode when output power of the solar cell is zero. In this case, the energy storage module powers the load module, and the second regulating circuit regulates the charging and discharging switch to control a discharging current of the energy storage module.

In summary, the power supply system and the power supply system control method provided in the present disclosure take into account energy distribution in all modes to ensure preferential power supply for the load module, and further ensure the charging efficiency of the energy storage module, thereby improving effective utilization of energy. In addition, during energy distribution in various scenarios, the solar cell is also controlled to work at a maximum output power point, thereby improving working efficiency of the solar cell.

It should be noted that the power supply system can track the maximum output power point of the solar cell in real time, and will adjust the first threshold voltage and the second threshold voltage in real time following the change of the maximum output power point. Thus, the initial state of the power supply system may be any of the above-described modes, and the power supply system may jump from any of the above-described modes to other modes of the power supply system. So, the power supply system may jump between any two modes.

Further, the first switching circuit in the above embodiment is a DC-DC converter, the third regulating circuit adjusts the output voltage of the first switching circuit by adjusting the duty cycle of the first switching circuit, and the first voltage loop adjusts the input voltage of the first switching circuit by adjusting the duty cycle of the first switching circuit. However, in other embodiments the first switching circuit may also be a conduction transistor, the third regulating circuit may regulate the output voltage of the first switching circuit by adjusting the control terminal voltage of the conduction transistor to change the conduction state of the conduction transistor, and the first voltage loop may regulate the input voltage of the first switching circuit by adjusting the control terminal voltage of the conduction transistor to change the conduction state of the conduction transistor.

The above explanation is an independent description of each mode. The control method provided in the present disclosure is described below on a premise that the power supply system works in a mode and based on mode switching in a specific working process of the power supply system.

Figure 9:
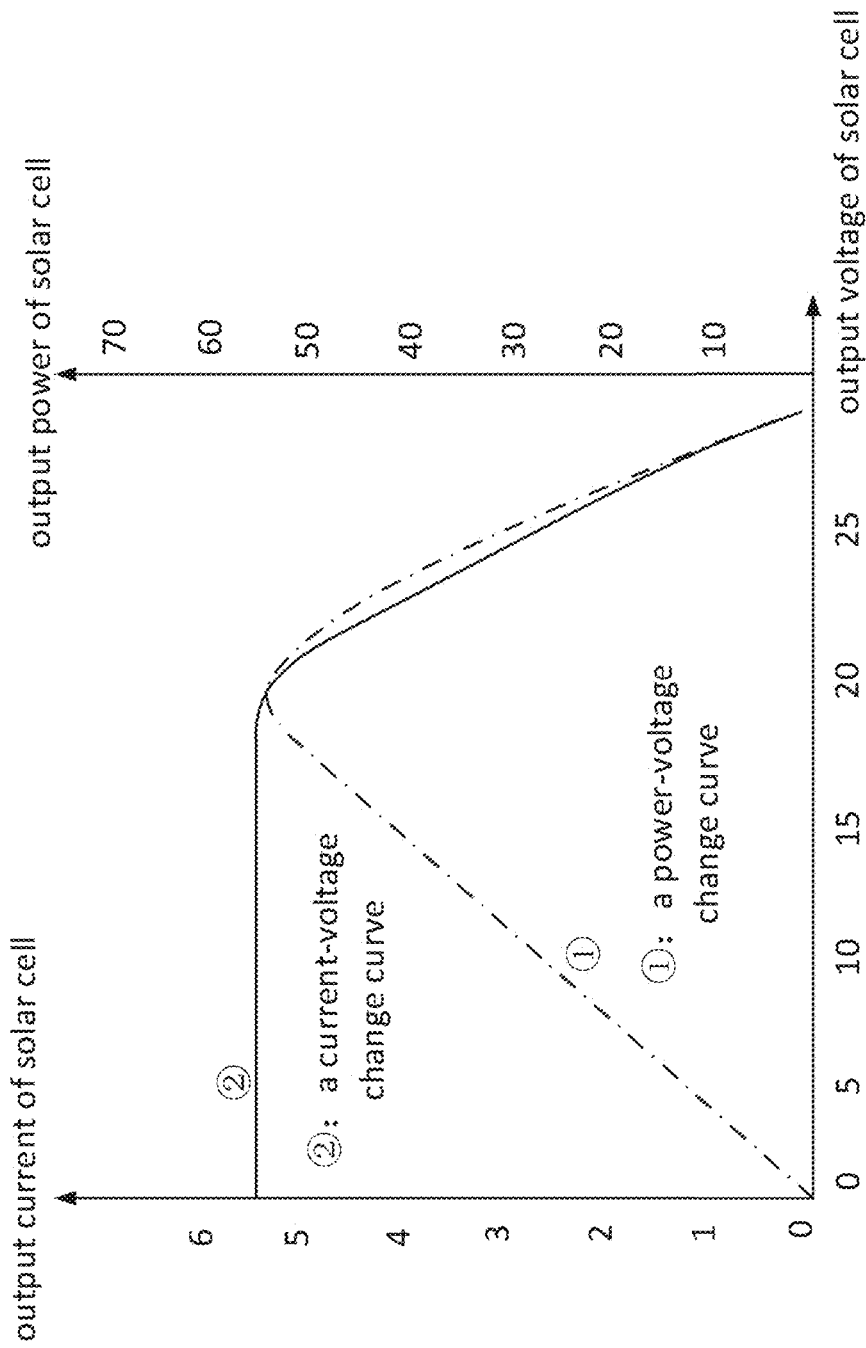
FIG. 9 shows a current-voltage change curve and a power-voltage change curve of a solar cell.

It is assumed that when the power supply system is started, the maximum input power of the solar cell is greater than the target power of the load module and less than the sum of the target power of the load module and the target power of the heating module, the temperature of the energy storage module is less than the first temperature threshold, and the electric quantity is less than the first preset electric quantity. In this scenario, both the load module and the heating module obtain energy from the solar cell. As shown in FIG. 9, the output power of the solar cell is pulled towards the maximum output power point. However, in this scenario, the maximum output power point still cannot enable the load module and the heating module to meet the target power, which also causes the output of the solar cell to be pulled down. Therefore, in order to prevent the output of the solar cell from being pulled down, the first regulating circuit is controlled to regulate the duty cycle of the second switching circuit to adjust the output voltage of the second switching circuit, such that the input voltage of the load module is the target voltage, and thus the actual power meeting the load module is the target power. In addition, the first voltage loop is controlled to regulate the duty cycle of the first switching circuit based on the output voltage of the solar cell and the first voltage threshold to adjust the input voltage of the first switching circuit, thereby stabilizing the output voltage of the solar cell at the first voltage threshold and decreasing the heating current of the heating module.

During the first mode, the temperature of the energy storage module gradually increases. When the temperature of the energy storage module increases to or exceeds the second temperature threshold, the power supply system switches to the second mode. In the second mode, it is assumed that the maximum output power of the solar cell is less than the sum of the target power of the load module and the target power of the energy storage module. If the electric quantity of the energy storage module is less than or equal to the second preset electric quantity, the first regulating circuit regulates the output voltage of the second switching circuit, such that the input voltage of the load module is the target voltage, and thus the actual power meeting the load module is the target power. In addition, the second regulating circuit regulates the conduction degree of the charging and discharging switch to adjust the charging current of the energy storage module. If the electric quantity of the energy storage module is greater than the second preset electric quantity, the first regulating circuit regulates the duty cycle of the second switching circuit to adjust the charging current of the energy storage module. In this case, the second regulating circuit controls the charging and discharging switch to be fully conducted. In this case, the charging and discharging switch is an equivalent resistor, and the charging current is determined by the first regulating circuit.

In addition, during the second mode, the temperature of the energy storage module is detected. If the temperature of the energy storage module is less than or equal to the preset temperature threshold, the power supply system enters the third mode. If the temperature of the energy storage module is still greater than the second temperature threshold, the power supply system maintains in the second mode.

In the third mode, if the electric quantity of the energy storage module is less than or equal to the second preset electric quantity, the first regulating circuit regulates the output voltage of the second switching circuit, such that the input voltage of the load module is the target voltage, and thus the actual power meeting the load module is the target power. In addition, the second regulating circuit regulates the conduction degree of the charging and discharging switch to adjust the charging current of the energy storage module. In addition, the first voltage loop regulates the duty cycle of the first switching circuit based on the output voltage of the solar cell and the first voltage threshold, thereby stabilizing the output voltage of the solar cell at the first voltage threshold and decreasing the heating current. Similarly, in the third mode, if the electric quantity of the energy storage module is greater than the second preset electric quantity, the first regulating circuit regulates the duty cycle of the second switching circuit to adjust the charging current of the energy storage module, the second regulating circuit regulates the charging and discharging switch to be fully conductive. In addition, the first voltage loop regulates the duty cycle of the first switching circuit based on the output voltage of the solar cell and the first voltage threshold, thereby stabilizing the output voltage of the solar cell at the first voltage threshold and decreasing the heating current.

In addition, the charging current is also adjusted based on the temperature of the energy storage module. If the temperature of the energy storage module is greater than the preset temperature threshold, the charging current of the energy storage module is increased to decrease the heating current. If the temperature of the energy storage module is less than the preset temperature threshold, the charging current of the energy storage module is decreased to increase the heating current.

In the third mode, the electric quantity of the energy storage module increases. When the electric quantity of the energy storage module is equal to or greater than the first preset electric quantity, the power supply system enters the fourth mode. The first regulating circuit regulates the duty cycle of the second switching circuit, such that the input voltage of the load module is the target voltage, and thus the actual power meeting the load module is the target power.

During the fourth mode, when the maximum output power of the solar cell is less than the target power of the load module due to a weather change, the power supply system enters the fifth mode. The second voltage loop regulates the duty cycle of the second switching circuit based on the output voltage of the solar cell and the second voltage threshold to adjust duty cycle of the second switching circuit, thereby stabilizing the output voltage of the solar cell at the second voltage threshold.

The present disclosure further provides a power supply system. The power supply system includes a solar cell, a load module, an energy storage module, a heating module, and a control module. The solar cell is connected to the load module and the energy storage module through a second switching circuit, the solar cell is connected to the heating module through a first switching circuit, and a charging and discharging switch is also connected between an input terminal of the load module and the energy storage module. The power supply system uses the above control method to adaptively adjust energy distribution among various modules based on a power supply demand change during operation of the power supply system, thereby ensuring efficient and normal operation of the power supply system.

It should be additionally noted that the provided specific implementation and corresponding legends are only one way to describe the implementation method of the present disclosure, and do not limit a specific structure of the implementation solution of the present disclosure. Various changes or modifications can be made to these implementations without departing from the principle and essence of the present disclosure, but all these changes and modifications shall fall within the protection scope of the present disclosure.

Although the embodiments are separately illustrated and described above, the embodiments contain some common technologies. Those skilled in the art can replace and integrate the embodiments. Any content not clearly recorded in one of the embodiments may be determined based on another embodiment where the content is recorded.

The implementations described above do not constitute a limitation on the protection scope of the technical solution of the present disclosure. Any modification, equivalent replacement, and improvement made in the spirit and principle of the above implementations should fall in the protection scope of the technical solution of the present disclosure.

What is claimed is:

1. A power supply system control method, comprising:
   controlling a power supply system to enter a first mode based on a power parameter comprising an output power of a solar cell, a temperature parameter comprising a temperature of an energy storage module, and an electric quantity parameter comprising a state of charge of the energy storage module, wherein in the first mode, a solar cell powers a load module and a heating module, the heating module heats the energy storage module, a second switching circuit connects an output of the solar cell and an input of the load module, the second switching circuit connects the output of the solar cell and an input of the energy storage module, and a first switching circuit connects the output of the solar cell and an input of the heating module;
   during the first mode, controlling a first regulating circuit wherein the first regulating circuit regulates the duty cycle of the second switching circuit to adjust an input voltage of the load module to a target voltage;
   according to the power parameter, controlling a first voltage loop wherein the first voltage loop changes the duty cycle of the first switching circuit or changes the conduction degree of the conduction transistor in the first switching circuit to regulate the first switching circuit to stabilize an output voltage of the solar cell at a first threshold voltage, wherein:
   the first threshold voltage is within the control accuracy of the voltage regulation circuit for the preset threshold voltage, and the preset threshold voltage is an output voltage of the solar cell working at a maximum output power point wherein:
   when a maximum output power of the solar cell is greater than a target power of the load module, an electric quantity of the energy storage module is less than a first preset electric quantity, and a temperature of the energy storage module is less than a first temperature threshold, the power supply system is controlled to enter the first mode;
   when a sum of a target power of the heating module and the target power of the load module is greater than the maximum output power of the solar cell, the first voltage loop is controlled to regulate the first switching circuit;
   wherein during the first mode, when the temperature of the energy storage module increases to or exceeds a second temperature threshold, the power supply system is controlled to enter a second mode, wherein in the second mode, the solar cell powers the energy storage module and the load module;
   wherein during the second mode, when the temperature of the energy storage module decreases to or is less than a preset temperature threshold, the power supply system is controlled to switch to a third mode;
   wherein in the third mode, the solar cell powers the energy storage module, the load module and the heating module;
   the preset temperature threshold is greater than the first temperature threshold and less than the second temperature threshold.

2. The power supply system control method according to claim 1, wherein when a sum of a target power of the energy storage module and the target power of the load module is greater than the maximum output power of the solar cell, a charging current of the energy storage module is reduced to start the first voltage loop, wherein the power supply system switches to the third mode.

3. The power supply system control method according to claim 1, wherein during the second mode, a second voltage loop is controlled to regulate the second switching circuit based on the power parameter, to stabilize the output voltage of the solar cell at a second threshold voltage,
   and a second regulating circuit is controlled to regulate a charging and discharging switch according to the electric quantity parameter, wherein the charging and discharging switch is connected between the load module and the energy storage module, wherein the second threshold voltage is within the control accuracy of the voltage regulation circuit for the preset threshold voltage, and the second threshold voltage is less than the first threshold voltage.

4. The power supply system control method according to claim 3, wherein when a sum of a target power of the energy storage module and the target power of the load module is greater than the maximum output power of the solar cell, the second voltage loop is controlled to regulate the second switching circuit; and when the electric quantity of the energy storage module is greater than a second preset electric quantity, the second regulating circuit controls the charging and discharging switch to be fully conductive; and when the electric quantity of the energy storage module is less than or equal to the second preset electric quantity, the second regulating circuit is controlled to regulate a conduction degree of the charging and discharging switch, the second preset electric quantity is less than the first preset electric quantity.

5. The power supply system control method according to claim 3, wherein the second voltage loop adjusts a duty cycle of the second switching circuit, according to the output voltage of the solar cell and the second threshold voltage.

6. The power supply system control method according to claim 1, wherein during the third mode, according to the electric quantity parameter, the first regulating circuit is controlled to regulate the second switching circuit to adjust the input voltage of the load module to the target voltage, or the first regulating circuit is controlled to regulate the second switching circuit to adjust a charging current of the energy storage module; and according to the power parameter, the first voltage loop is controlled to regulate the first switching circuit to stabilize an output voltage of the solar cell at the first threshold voltage.

7. The power supply system control method according to claim 6, wherein when the electric quantity of the energy storage module is less than or equal to a second preset electric quantity, a sum of a target power of the energy storage module, the target power of the load module and the target power of the heating module is greater than the maximum output power of the solar cell, the first regulating circuit is controlled to regulate the second switching circuit to adjust the input voltage of the load module to the target voltage, a second regulating circuit regulates a conduction degree of a charging and discharging switch, the first voltage loop is controlled to regulate the first switching circuit, the charging and discharging switch is connected between the load module and the energy storage module, the second preset electric quantity is less than the first preset electric quantity; and when the electric quantity of the energy storage module is greater than the second preset electric quantity, the sum of the target power of the energy storage module, the target power of the load module and the target power of the heating module is greater than the maximum output power of the solar cell, the first regulating circuit is controlled to regulate the second switching circuit to adjust the charging current of the energy storage module, a second regulating circuit controls the charging and discharging switch to be fully conductive, the first voltage loop is controlled to regulate the first switching circuit.

8. The power supply system control method according to claim 7, wherein the charging current of the energy storage module is adjusted to maintain the temperature of the energy storage module at the preset temperature threshold.

9. The power supply system control method according to claim 6, wherein the first regulating circuit adjusts the input voltage of the load module to the target voltage or adjusts the charging current of the energy storage module by regulating a duty cycle of the second switching circuit.

10. The power supply system control method according to claim 1, wherein during the second mode, the first regulating circuit is controlled to regulate the second switching circuit to adjust the input voltage of the load module to the target voltage, or the first regulating circuit is controlled to regulate the second switching circuit to adjust a charging current of the energy storage module, in accordance with the power parameter and the electric quantity parameter.

11. The power supply system control method according to claim 1, wherein during the second mode, when the electric quantity of the energy storage module increases to or exceeds the first preset electric quantity, the power supply system is controlled to enter a fourth mode, wherein in the fourth mode, the solar cell powers the load module; and during the fourth mode, the first regulating circuit is controlled to regulate the second switching circuit to adjust the input voltage of the load module to the target voltage.

12. The power supply system control method according to claim 1, wherein the power supply system tracks a maximum output power of the solar cell in real time;

when the maximum output power of the solar cell is less than a target power of the load module, the power supply system is controlled to enter a fifth mode, wherein in the fifth mode, the energy storage module and the solar cell power the load module; and during the fifth mode, a second voltage loop is controlled to regulate the second switching circuit to stabilize the output voltage of the solar cell at a second threshold voltage, wherein the second threshold voltage is close to or equal to the preset threshold voltage.

13. The power supply system control method according to claim 12, wherein the first threshold voltage and the second threshold voltage are adjusted based on the maximum output power tracked in real time.

14. The power supply system control method according to claim 1, wherein the first switching circuit comprises a conducting transistor, and the first voltage loop adjusts a conduction degree of the conducting transistor according to the output voltage of the solar cell and the first threshold voltage.

15. The power supply system control method according to claim 1, wherein the first switching circuit comprises a direct current (DC)-DC converter, the first voltage loop adjusts a duty cycle of the DC-DC converter, according to the output voltage of the solar cell and the first threshold voltage.

16. The power supply system control method according to claim 1, wherein during the first mode, when a sum of a target power of the heating module and a target power of the load module is less than or equal to a maximum output power of the solar cell, a third regulating circuit regulates the first switching circuit to adjust an input voltage of the heating module to the target voltage.

* * * * *